Oct. 5, 1971 H. L. HART 3,610,063
SPRING DETENT HUB
Filed Nov. 7, 1969
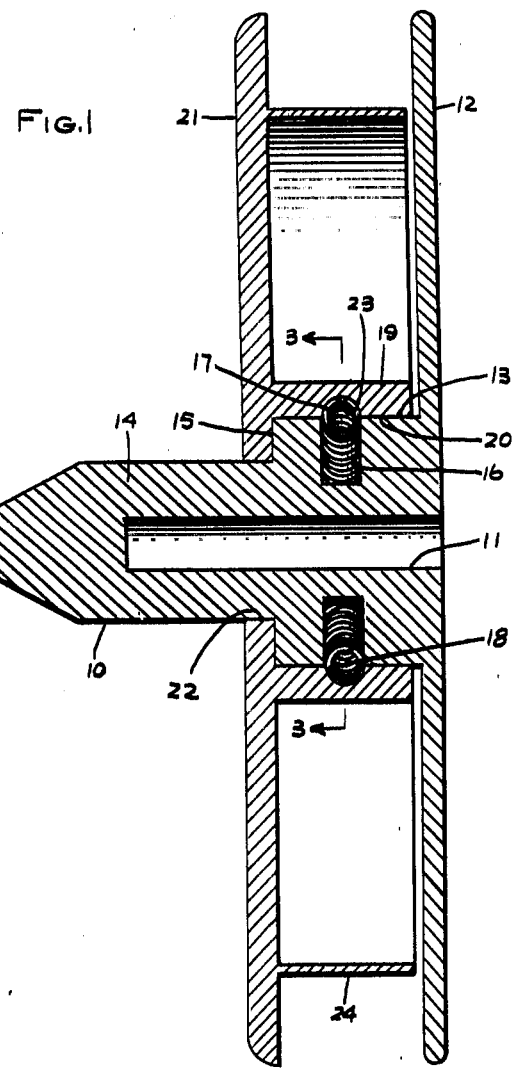
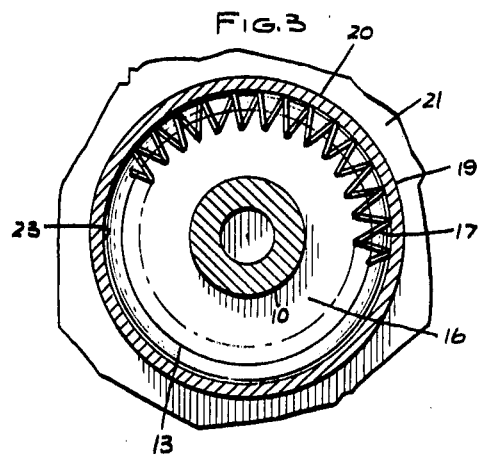
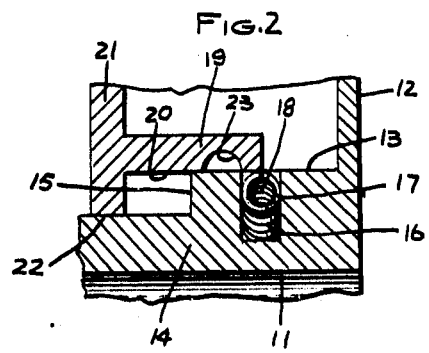
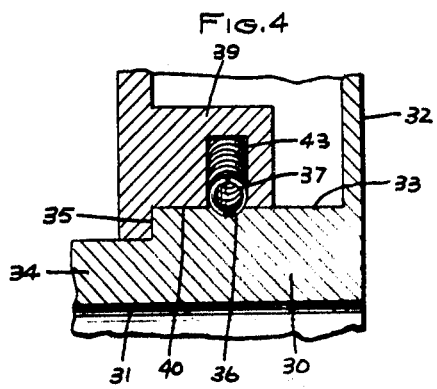
INVENTOR:
HARRY L. HART,
BY Hood, Gust, Irish & Lundy
ATTORNEYS.

United States Patent Office 3,610,063
Patented Oct. 5, 1971

3,610,063
SPRING DETENT HUB
Harry L. Hart, Fort Wayne, Ind., assignor to Lincoln Logotype Co., Inc., Fort Wayne, Ind.
Filed Nov. 7, 1969, Ser. No. 874,827
Int. Cl. F16h 55/36
U.S. Cl. 74—230.01            5 Claims

ABSTRACT OF THE DISCLOSURE

A spring detent for telescoping elements which comprises a perimetral groove in the outer surface of the inner element, a perimetral groove in the inner surface of the outer element, said grooves being in registry when said elements are in optimum assembled relation, and a perimetrally-elastic tore engaging in the registering grooves to latch the telescoped elements in such relation, each of the grooves having a mouth dimension, measured in an axial direction relative to said elements, substantially equal to the cross-sectional diameter of the tore, one of the grooves having a dimension, measured in a radial direction relative to said elements, substantially equal to one-half the cross-section diameter of the tore, and the other groove having a dimension, measured in a radial direction relative to said elements, at least equal to the cross-sectional diameter of the tore.

---

The present invention relates to a spring detent hub, and is particularly concerned with the provision of novel means for removably retaining, against accidental axial displacement, a pair of telescoped elements. More particularly, the invention constitutes an improvement upon the detent means disclosed in the patent to Millard B. Beaver, No. 3,327,624 issued June 27, 1967, and it is particularly adapted for use in the marking apparatus disclosed in that prior patent.

The primary object of the present invention is to provide a very inexpensive, but highly effective, automatically-operating detent or latch means which will automatically engage when two telescopically-arranged elements are brought into optimum relationship to retain that relationship under normal operating conditions, but which will readily permit the two elements to be relatively axially moved and separated from each other by easy, manual manipulation.

Further objects of the invention will appear as the description proceeds.

The above-mentioned and other features and objects of this invention and the manner of attaining them will become more apparent and the invention will be best understood by reference to the following description of an embodiment of the invention taken in conjunction with the accompanying drawings wherein:

FIG. 1 is a longitudinal section through an assembly comprising a pair of telescopically-related elements, with our latch means engaged to retain said elements against accidental, axial separation;

FIG. 2 is a fragmentary section, taken in the same plane, and showing the parts during manual separation;

FIG. 3 is a fragmentary section taken on the line 3—3 of FIG. 1; and

FIG. 4 is a fragmentary view similar to FIG. 2 but showing a modified form of the invention.

DESCRIPTION OF THE PREFERRED EMBODIMENT

Referring more particularly to the drawings, it will be seen that we have illustrated an arbor 10 formed with a coaxial socket 11 whereby it may be mounted upon a shaft (not shown) for rotation about its own axis. A disc-like flange 12, preferably concentric with, and lying in a plane normal to the axis of the arbor 10 is disposed substantially at one end of said arbor. Near the flange 12, the arbor is formed to provide an external perimetral face 13 which is preferably, but not necessarily, cylindrical. A reduced extension 14 at the end of the arbor remote from the flange 12 defines a shoulder 15.

A continuous, perimetral groove 16 opens through the arbor face 13 for the reception of a perimetrally-elastic tore 17. As shown, the tore 17 is an endless, coiled spring, and we presently believe this to be the optimum form of such tore, though other toric devices may be substituted therefore. The essential characteristic of the tore 17 is that it shall be perimetrally elastic—that is, that it may be perimetrally either elongated or shortened, whereby the primary diametrical dimension of the tore will be increased or reduced, and that, upon relaxation, the tore will return resiliently to an equilibrium condition of predetermined perimetral dimension.

In the form of invention illustrated in FIGS. 1-3, the perimetral axis of the tore 17 is indicated by the reference numeral 18, and the length of that perimetral axis may be considered to be the mean perimetral dimension of the tore 17. According to the invention, that mean perimetral dimension will be substantially equal to the perimetral dimension of the surface 13. The dimension of the groove 16, measured in the direction of the axis of the arbor 10 will be substantially equal to the cross-section diameter of the tore 17. Thus, when the tore 17 is assembled to the groove 16 while in equilibrium condition, it will ordinarily lie in the position illustrated in FIG. 1, half in and half out of the groove 16.

A sleeve 19 having an internal face 20 which conforms to the face 13 of the arbor 10 and is adapted for snug telescopic association with said arbor face, carries at one end a disc-like flange 21 which is perforated at 22 to pass the reduced extension 14 of the arbor 10. At a point significantly removed from both ends of the sleeve 19, said surface 20 is formed with a continuous, perimetral groove 23. The dimension of said groove measured in the direction of the axis of the sleeve 19 is substantially equal to the cross-sectional diameter of the tore 17, and the dimension of said groove, measured in a direction radial with respect to the sleeve 19 is substantially equal to one-half the cross-sectional diameter of the tore 17. Preferably, and as shown, the groove 23 is semicircular in cross-section, upon a radius equal to the cross-sectional radius of the tore 17. As is clearly shown in FIGS. 1-3, the dimension of the groove 16 measured in a direction radial relative to the arbor 10, is at least equal to the cross-sectional diameter of the tore 17.

In the illustrated embodiment of the invention, the disc 21 carries a barrel 24, at a radius much larger than that of the sleeve 19, said barrel projecting toward the disc 12 when the parts are assembled.

It will be seen that, in the condition of FIG. 1, the tore 17 engages in the grooves 16 and 23 to restrain the elements 19 and 10 against relative axial movement. However, the element 19 can be relatively easily manually withdrawn from its association with the element 10 by grasping the flanges 12 and 21 and manually exerting a separating force thereon. Under such circumstances, the groove 23 will exert an ensmalling force upon the tore 17 to push said tore radially inwardly and wholly into the groove 16 in the manner suggested in FIG. 2. As the separation continues beyond the condition of FIG. 2, so that the surface 20 of the sleeve 19 leaves its engagement with the tore 17, said tore will resiliently return to its condition of equilibrium in which the (imaginary) core 18 will lie substantially in coincidence with the surface 13 of the arbor.

Now, when the parts are to be reassembled, the distal edge of the sleeve 19, as it slides toward the right on the surface 13, will engage the retreating surface of the tore 17 again to exert an ensmalling affect upon said tore, thus compressing the tore perimetrally to force it more deeply into the groove 16, whereby the distal portions of the surface 20 may slide past the reduced tore until the groove 23 comes into registry with the groove 16 whereupon the tore will reexpand to become seated in the groove 23 in the manner illustrated in FIG. 1.

In FIG. 4, we have illustrated a modified form of the invention in which the arbor 30 is formed with a coaxial socket 31 and carries a flange 32 similar to the flange 12. The external face 33 of the arbor terminates in a shoulder 35 defined by the reduced extension 34. A continuous, perimetral groove 36 formed in the face 33 has a dimension, measured axially of the arbor, substantially equal to the cross-sectional diameter of the tore 37, and has a dimension measured radially relative to the arbor 30 substantially equal to the cross-sectional radious of the tore 37.

In this form of the invention, the sleeve 39 is radially thicker than the sleeve 19 and its internal face 40 is formed with a continuous, peripheral groove 43 which has a dimension, measured in the direction of the axis of the sleeve 39, substantially equal to the cross-sectional diameter of the tore 37 but has a dimension, measured radially with respect to the sleeve 39, at least as great as the cross-sectional diameter of the tore 37. The equilibrium mean perimetral dimension of the tore 37 again will be substantially equal to the perimetral dimension of the face 40 of the flange 39 or of the face 33 of the arbor 30 so that, when the parts are assembled in the manner illustrated in FIG. 4, the tore 37 will act to retain the parts 30 and 39 against accidental relative axial movement. However, when a sufficient separating force is applied to the parts, the groove 36 will exert an enlarging force upon the tore 37 to expand the same wholly into the groove 43, whereby the tore 37 will move with the sleeve 39 to pass the shoulder 35. Once the tore has been moved past the shoulder 35 and thus off the surface 33, it will resiliently return to its equilibrium condition in which it projects inwardly beyond the mouth of the groove 43. Thus, when the parts are to be reassembled, the tore 37 will again be expanded wholly into the groove 43, as it engages the shoulder 35, and it will be carried along the surface 33 until the groove 43 comes into registry with the groove 36 whereupon the tore 37 will contract into engagement in the groove 36 to act as a detent.

We presently prefer the form of invention illustrated in FIGS. 1–3 because, when the parts are arranged upon a horizontal axis as illustrated, the tore 37 has a tendency to fall out of the groove 43 upon separation of the parts; but it will be apparent that, when the parts are arranged upon a vertical avis, that tendency will not be particularly pronounced.

What is claimed is:

1. In combination, an arbor formed with a continuous, perimetral groove in its external face, a mating member formed to provide a sleeve snugly receiving said arbor to overlie said groove, the internal face of said sleeve being formed with a second continuous, perimetral groove adapted to register with said first-named groove, and a perimetrally-elastic tore having an equilibrium mean perimentral dimension substantially equal to the perimetral dimensions of said external arbor face and said internal sleeve face, each of said grooves having an axial dimension substantially equal to the cross-sectional diameter of said tore, and one only of said grooves having a dimension, measured radially relative to said arbor and sleeve, at least equal to the cross-sectional diameter of said tore.

2. The combination of claim 1 in which said tore is an endless coiled spring.

3. The combination of claim 1 in which said grooves are significantly spaced from both ends of the respective members in which they are formed.

4. The combination of claim 1 in which said one groove is the groove in said arbor and in which said groove in said sleeve has a dimension, measured radially relative to said sleeve, substantially equal to one-half of the cross-sectional diameter of said tore.

5. In combination, an elongated cylindrical arbor adapted to be rotated about the axis thereof, a disc-like flange on one end of said arbor, a sleeve telescopically removably fitted over the outside of said arbor, said sleeve having a second disc-like flange thereon which is parallel to and spaced from the first-named flange when said sleeve and arbor are assembled, said second flange having a cylindrical barrel element thereon which extends toward said first-named flange, said barrel element being spaced from said arbor and coaxial with respect to said axis, and detent means as defined in claim 1 for detachably securing said sleeve onto said arbor.

References Cited

UNITED STATES PATENTS

| | | | |
|---|---|---|---|
| 1,891,460 | 12/1932 | Vlahek | 287—135 X |
| 2,615,735 | 10/1952 | Heimann et al. | 287—135 UX |
| 3,327,624 | 6/1967 | Beaver | 287—135 UX |

FOREIGN PATENTS

| | | | |
|---|---|---|---|
| 6,379 | 1903 | Great Britain | 74—230.17 |

C. J. HUSAR, Primary Examiner

U.S. Cl. X.R.

24—213